United States Patent [19]

Harris et al.

[11] Patent Number: 5,443,746
[45] Date of Patent: Aug. 22, 1995

[54] FERROELECTRIC AEROGEL COMPOSITES FOR VOLTAGE-VARIABLE DIELECTRIC TUNING, AND METHOD FOR MAKING THE SAME

[75] Inventors: Norman H. Harris, Newhall; Brian M. Pierce, Moreno Valley; Carl W. Townsend, Los Angeles; Thomas K. Dougherty, Playa Del Rey, all of Calif.

[73] Assignee: Hughes Aircraft Company, Los Angeles, Calif.

[21] Appl. No.: 195,111

[22] Filed: Feb. 14, 1994

[51] Int. Cl.⁶ .................. C04B 35/46; C04B 41/48
[52] U.S. Cl. ..................... 252/62.9; 252/62.54; 501/134; 501/136; 501/137
[58] Field of Search .............. 252/62.9, 62.54; 501/134, 136, 137, 12

[56] References Cited

U.S. PATENT DOCUMENTS

| | | | |
|---|---|---|---|
| 4,232,214 | 11/1980 | Shioi et al. | 219/541 |
| 4,245,146 | 1/1981 | Shioi et al. | 219/381 |
| 4,726,099 | 2/1988 | Card et al. | 252/62.9 |
| 5,143,636 | 9/1992 | Gaucher et al. | 252/62.9 |

FOREIGN PATENT DOCUMENTS 912714  3/1982  U.S.S.R. ................. 252/62.9

OTHER PUBLICATIONS

K. M. Johnson, Journal of Applied Physics, vol. 33, pp. 2826–2831, (1962).
Electronics Designer's Handbook, L. J. Giacoletto, Ed., McGraw-Hill, New York, pp. 2–60, 2–61, 2–64, (1977).

Primary Examiner—David Brunsman
Attorney, Agent, or Firm—M. E. Lachman; M. W. Sales; W. K. Denson-Low

[57] ABSTRACT

Ferroelectric composites are prepared by sol-gel derived procedures. The present invention utilizes the sol-gel process (1) to form a gel in a mold of the desired size and shape, (2) to dry the gel using a supercritical fluid extraction, (3) to sinter the dried gel to a crystalline ceramic, and finally (4) to impregnate the pores with a low loss polymer. The aerogel composition may be a barium titanate-based composition such as barium strontium titanate (BST). Making a ferroelectric aerogel composite provides a unique and novel means of fully exploiting the voltage- and/or frequency-tunable properties of certain compositions by maximizing their desirable properties and minimizing their undesirable characteristics such as loss at operational frequencies.

19 Claims, 4 Drawing Sheets

FERROELECTRIC AEROGEL COMPOSITES FOR VOLTAGE-VARIABLE DIELECTRIC TUNING, AND METHOD FOR MAKING THE SAME

BACKGROUND OF THE INVENTION

1. Field of the Invention

The present invention relates to ferroelectric composites, and more particularly, to a method for preparing such composites employing sol-gels.

2. Description of Related Art

The use of ferroelectric ceramics with voltage-tunable dielectric properties for electronically-scanned array (ESA) antenna applications has been severely limited due to a lack of suitable fabricated materials. The properties needed for these applications at high frequencies (about 10 to 80 Giga Hertz, GHz) include a low dielectric constant (less than about 100), a low loss tangent tan $\delta$ (less than about 0.010), a large electric field-induced change in refractive index (ranging from 0.25 to 1.2) with a maximum applied electric field of less than 50 kV/cm, and a high dielectric breakdown strength (about 80,000 to 100,000 V/cm).

Composites have been under development with the idea of achieving a low-loss tangent by impregnating a porous structure with a low-loss polymer. These methods have involved the preparation of a ceramic powder, mixing it with a binder, burning out the binder to achieve a porous structure, sintering (firing), and then infiltrating the structure with a polymer. The difficulty with this conventional approach is that the homogeneity of the microstructure and resulting dielectric properties are not controllable within the desired limits of ±2% rms. Further, the polymer-impregnated ferroelectric composite exhibits loss at the operational frequencies, which is due, in part, to the presence of impurities introduced by conventional ceramic processing.

Prior art approaches to provide materials with voltage-variable dielectric properties include two basic methods, neither of which is entirely satisfactory for the high-frequency ESA antennas. One method involves the use of porous ferroelectrics such as barium strontium titanate ((Ba,Sr)TiO$_3$; BST). The porous BST suffers from the separation of the individual particles with higher pore volumes and intrinsic difficulty in achieving a homogenous microstructure which controls the range of resulting dielectric properties. The separation of the individual particles is described as a lack of "connectivity" which is a term used to describe the degree of touching or connection between the particles. When the particles become more disconnected, then the applied field moves more into the polymer filler, which reduces the electric field-induced change in refractive index of the composite. The field must then be increased to obtain at least some electric field-induced change in refractive index, which leads to a dielectric breakdown or catastrophic arcing in the BST composite.

The other method of achieving some electric field-induced change in refractive index is that of employing a honeycomb, or similarly structured, composite. The difficulty with this method is that the pores are relatively quite large, so that the effective range is limited to lower frequencies, less than about 5 GHz.

Thus, a ferroelectric composite having a controlled, small-pore size is required, together with a process for making the same, for use at higher frequencies, on the order of 10 to 80 GHz.

SUMMARY OF THE INVENTION

In accordance with the invention, a ferroelectric ceramic having a very uniform, small-pore size microstructure having a high porosity is provided. The pores of the ferroelectric ceramic are filled with an appropriate polymer to provide a novel ferroelectric composite. The minimum pore size within the composite depends upon the maximum operating frequency for the ESA antenna. The pores (and other scattering centers) in the ferroelectric aerogel composite should be small enough so that the diameter d of these centers is bounded by the following expression:

$$d \leq \frac{0.05c}{\nu \sqrt{\epsilon_c}}, \tag{1}$$

where c is the speed of light, $\nu$ is the operating frequency and $\epsilon_c$ is the real part of the dielectric constant of the composite. The porosity of the ferroelectric aerogel can be as high as 98%, which exceeds the porosity of prior art materials by 20 to 30%.

The ferroelectric materials beneficially treated in accordance with the invention are the perovskites, which are characterized by the formula ABO$_3$. Well-known examples of such ferroelectric perovskites include BaTiO$_3$ and (Ba,Sr)TiO$_3$.

The ferroelectric composite of the present invention is provided by a sol-gel derived aerogel preparation process. The process comprises:

(a) providing alcoholates of the respective metals employed in the ferroelectric material;

(b) combining the metal alcoholates and subjecting them to an equilibration reaction to form an equilibrated metal alcoholate solution;

(c) hydrolyzing and condensing the equilibrated solution product to form a gel having pores permeated with water and alcohol;

(d) removing the water and alcohol from the pores to leave an aerogel foam;

(e) heat-treating the aerogel foam; and (f) filling the pores with a suitable polymer to form the ferroelectric composite.

The final product, comprising a porous ferroelectric material whose pores are filled with a low (<3) dielectric constant polymer, is characterized by a pore size depending on the maximum operational frequency of the ESA antenna and the real part of the dielectric constant of the material, as set forth in Eqn. (1), above. If the operational frequency is 94 GHz and the dielectric constant is 30, then the pore size can be no greater than 30 μm. The maximum pore size distribution should be less than 30 μm. The porosity depends on the dielectric constant and loss tangent sought for the polymer-infiltrated aerogel composite. High/low porosity yields low/high values for the dielectric constant and loss tangent. As a rule, the porosity should be greater than 80% for aerogel composites made from ferroelectric perovskites.

The present invention overcomes the difficulties associated with the prior art through the use of the sol-gel derived aerogel preparation process. Fabrication of the ferroelectric ceramic using the aerogel route permits preparation of a very uniform, small-pore size microstructure material which can be formed into the desired shape. The process eliminates many conventional ceramic processing steps which introduce impurities, such as milling, grinding, binder addition, mixing, screening, and pressing. The sol-gel process for fabricating aerogels permits fabrication of an ultra-pure finished product. The high purity together with the very small pore size provides a means of achieving low loss at high frequencies.

The ferroelectric aerogel composite of the present invention overcomes the lack of interconnectivity associated with prior art structures at porosities greater than 70 to 80% with a fully connected aerogel structure.

The homogeneity problem of prior art porous BST is eliminated by the very uniform micro-pore aerogels. The aerogel process of the present invention prevents impurities from entering the micro-structure.

The ferroelectric aerogel composite micropores minimize the scattering of microwave and millimeter-wave radiation to allow its use at frequencies of interest (10 to 80 GHz), beyond the range of the honeycomb composites.

DESCRIPTION OF THE PREFERRED EMBODIMENTS

Figure 1:
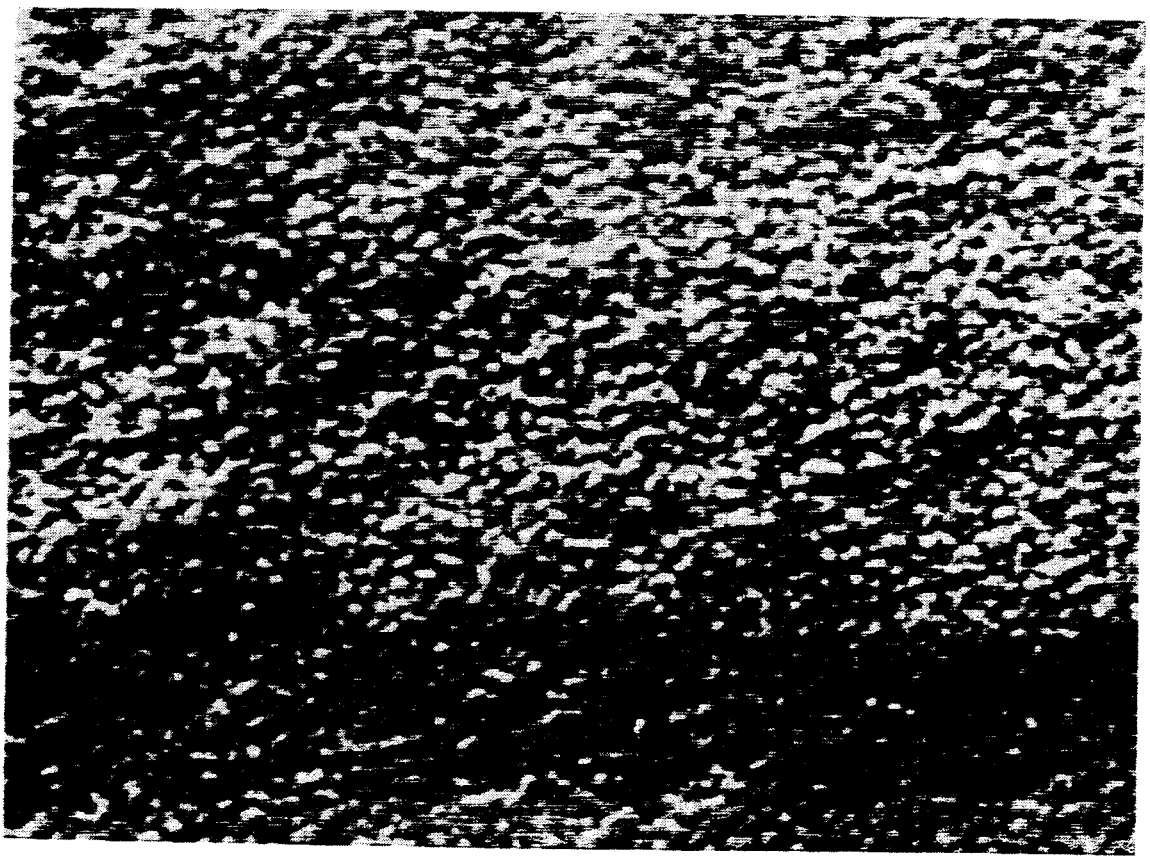
FIG. 1 is a photomicrograph depicting the microstructure of a typical BST aerogel heat-treated for 1 hour at 500° C. and then impregnated with polystyrene (SEM photograph taken at 10,000×magnification)

The ferroelectric aerogel composite of the present invention provides a means for the intrinsic non-linear characteristics of some ferroelectric ceramics to be exploited for microwave antennas and other applications. An analysis of the dielectric properties of the ferroelectric aerogel composite will be given first, followed by a description of their fabrication by the methods of the present invention.

The description which follows is presented in terms of a specific perovskite ferroelectric material, (Ba,Sr)TiO$_3$. However, it will be readily appreciated that other ferroelectric oxide materials, such as titanates, zirconates, tantalates, and niobates, may also be treated by the process of the invention to provide a novel ferroelectric composite.

Theoretical Analysis of the Dielectric Properties of Ferroelectric Aeroqel Composites The important dielectric properties of a two-phase ferroelectric aerogel composite are (1) the real permittivity, or real part of the dielectric constant, $\epsilon_c$; (2) the loss tangent, tan $\delta$; (3) the fractional tunability $T_c$; (4) the scan figure-of-merit, SFM$_c$; and (5) the loss or attenuation $\alpha_c$. The equations defining these properties are described below.

1. Permittivity:

The permittivity of a two-phase ferroelectric aerogel composite can be estimated by the logarithmic law of mixing derived by Lichtenecker and Rother:

$$\epsilon_c = X_f \log \epsilon_f + (1 - X_f) \log \epsilon_p \qquad (2)$$

where $X_f$ and $\epsilon_f$ are the volume fraction and permittivity of the ferroelectric phase, and $\epsilon_p$ is the permittivity of a polymer-filler phase.

Eqn. (2) can be rewritten as $$\epsilon_c = \epsilon_f^{X_f} \epsilon_p^{X_p} \qquad (3)$$

It will be noted that Eqns. (2) and (3) are rigorously applicable to a random mixture having spherical- or near-spherical-shaped inclusions.

2. Loss Tangent:

The loss tangent of a two-phase ferroelectric aerogel composite can be estimated by an arithmetic law of mixing:

$$\tan \delta_c = X_f \tan \delta_f + (1 - X_f) \tan \delta_p, \qquad (4)$$

where tan $\delta_f$ and tan $\delta_p$ are the loss tangents for the ferroelectric and polymer filler phases, respectively.

3. Fractional Tunability:

The fractional tunability for a two-phase ferroelectric aerogel composite is defined as:

$$T_c = |\Delta \epsilon_c| / \epsilon_c, \qquad (5)$$

where $|\Delta \epsilon_c|$ is the change in permittivity from zero voltage bias to maximum applied dc bias. Based on Eqn. (3), this term can be expressed as:

$$|\Delta \epsilon_c| = |\epsilon_f^{X_f} \epsilon_p^{X_p} - (\epsilon_f - T_f \epsilon_f)^{X_f} (\epsilon_p - T_p \epsilon_p)^{X_p}|, \qquad (6)$$

where $T_f$ and $T_p$ are the fractional tunabilities for the ferroelectric and polymer phases, respectively. It will be noted that it is assumed here that the applied dc bias reduces $\epsilon_f$ and $\epsilon_p$.

4. Scan Figure of Merit:

The scan figure of merit, SFM$_c$, for a two-phase ferroelectric aerogel composite is the electric field-induced change in refractive index and is defined as:

$$SFM_c = \sqrt{\epsilon_c} - \sqrt{\epsilon_c - |\Delta \epsilon_c|} \qquad (7)$$

5. Loss:

The loss or attenuation of an electromagnetic field propagating in a two-phase ferroelectric aerogel composite is given by:

$$\alpha(dB/cm) = \frac{3.41\pi}{\lambda(cm)} \sqrt{\epsilon_c} \tan \delta_c, \qquad (8)$$

where $\lambda$(cm) is the wavelength of the electromagnetic wave in a vacuum.

Predicated Performance of a Two-Phase Ferroelectric Aerogel Composite

Consider a two-phase ferroelectric aerogel composite consisting of the ferroelectric ceramic, barium strontium titanate (Ba$_{0.6}$Sr$_{0.4}$TiO$_3$), and the polymer filler, polystyrene. The salient dielectric properties measured at 3 GHz and 26° C. for the pure-barium strontium titanate phase are $\epsilon_f = 2650$, tan $\delta = 0.15$ and $T_f = 0.56$ for a 28,000 V/cm bias field, as reported by K. M. Johnson, *Journal of Applied Physics*, Vol. 33, Pp. 2826–2831, (1962). The important dielectric properties measured at 3 GHz and 25° C. for the polystyrene phase are $\epsilon_p = 2.5$, tan $\delta_p = 0.002$, and $T_p \sim 0.0$, as reported in *Electronics*

Designer's Handbook, L. J. Giacoletto, Ed., McGraw-Hill, New York, pg. 2–64, (1977).

The dielectric properties of the composite calculated as a function of $X_f$ are listed in Table I.

TABLE I

| | Calculated Dielectric Properties of a Two-Phase Ferroelectric Aerogel Composite Consisting of Barium Strontium Titanate and a Polystyrene Filler[a]. | | |
|---|---|---|---|
| $X_f$ | $\epsilon_c$ | $SFM_c$ | $\alpha^b$, db/inch[c] |
| 0.00 | 2.50 | 0.00 | 0.02 |
| 0.01 | 2.68 | 0.01 | 0.04 |
| 0.05 | 3.54 | 0.04 | 0.12 |
| 0.10 | 5.02 | 0.09 | 0.26 |
| 0.15 | 7.11 | 0.16 | 0.44 |
| 0.20 | 10.07 | 0.25 | 0.68 |
| 0.25 | 14.26 | 0.37 | 1.00 |
| 0.30 | 20.21 | 0.52 | 1.42 |
| 0.35 | 28.63 | 0.72 | 1.96 |
| 0.40 | 40.56 | 0.96 | 2.65 |

Notes:
[a]Properties calculated for a radiation frequency of 3 GHz and a temperature of 26° C.
[b]The loss scales with frequency.
[c]To convert to db/cm, divide by 2.54.

The salient conclusion that can be drawn from the calculated results presented in Table I is that a ferroelectric aerogel composite with a reasonable ferroelectric volume fraction of about 0.2 to 0.3 is predicted to have a permittivity in the desired range of about 10 to 20, a scan figure of merit in the desired range of about 0.25 to 0.52, and a loss ranging from 0.68 to 1.42 dB/inch (0.27 to 0.56 dB/cm) at 3 GHz.

The predicted properties in the Table are within the requirements for ESA antenna applications at microwave frequencies.

Size of Inclusions in the Ferroelectric Aerogel Composite

The inclusions in the ferroelectric aerogel composite should be small enough so that the electromagnetic wave at the frequency or wavelength of interest is not scattered by these inclusions. According to the theory of the scattering of electromagnetic radiation, an upper bound on the size d of the inclusions is given by the following expression:

$$d \leq \frac{0.05\lambda}{\sqrt{\epsilon_c}} = \frac{0.05c}{\nu\sqrt{\epsilon_c}}, \quad (9)$$

where c is the speed of light and v is the frequency. Thus, for $\nu=94$ GHz and $\epsilon_c=30$, the inclusion size can be no greater than about 6 μm. This upper bound increases with decreasing frequency. Submicrometer pore sizes and inclusions can be easily achieved using the aerogel approach to fabricating ferroelectric composites.

Connectivity of Ferroelectric Aerogel

A ferroelectric aerogel is connected almost by definition. In contrast to the conventional approaches to the fabrication of porous ceramics, the aerogel approach establishes connectivity at the atomic and/or molecular level through solution-gelation chemistry.

The microstructure in FIG. 1 illustrates the skeletal aerogel connectivity. Specifically, FIG. 1 shows the aerogel impregnated with polystyrene.

Fabrication Method

Figure 2:
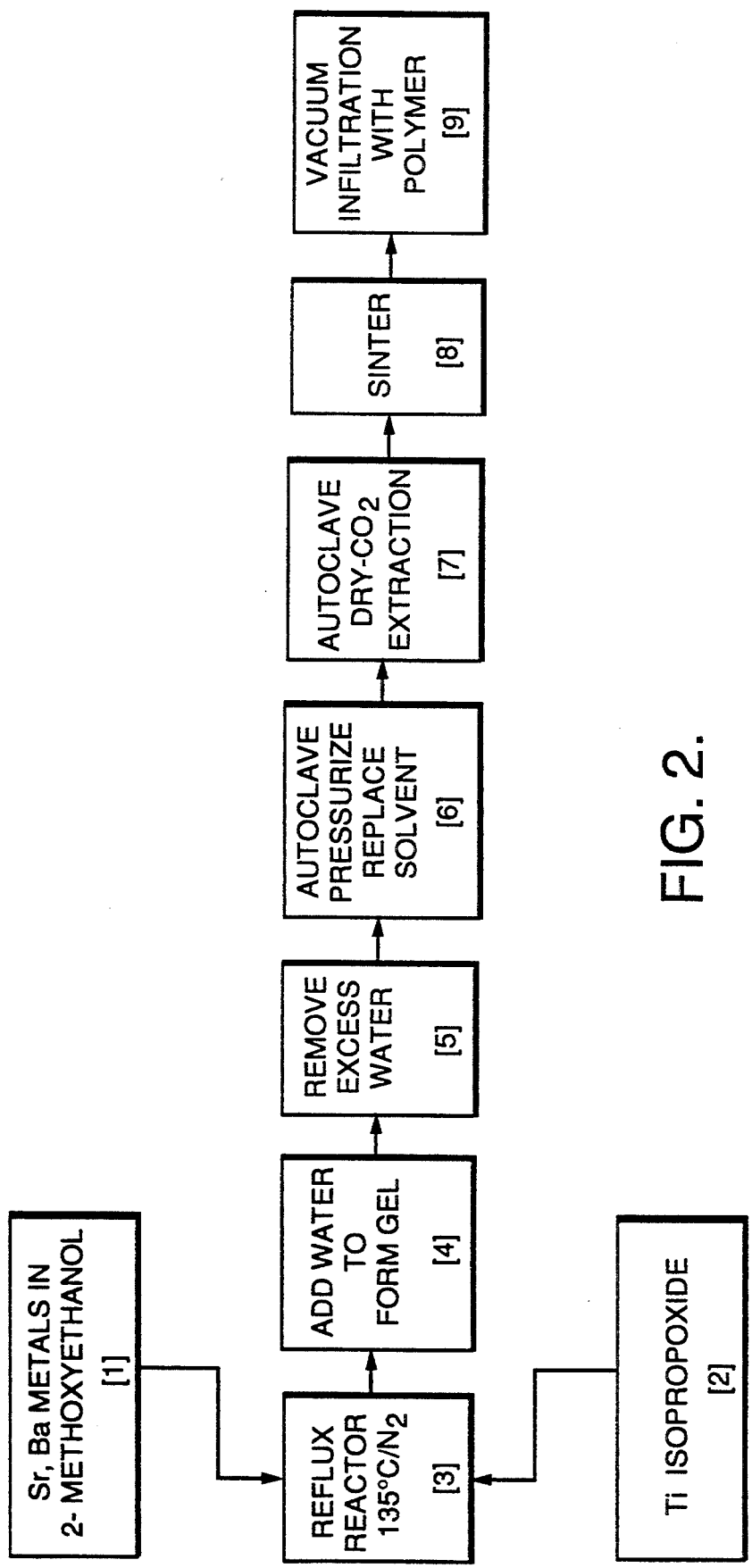
FIG. 2 is a flow chart for the fabrication of ferroelectric aerogel composites in accordance with the invention.

The ferroelectric aerogel composite of the present invention can be fabricated using an aerogel preparation process shown in the flow chart in FIG. 2. Preparation of aerogels in the past has been limited largely to silica, alumina, and zirconia.

It will be noted that the process avoids the contaminating activities of crushing, grinding, and screening of conventional ceramic processing. The process of the present invention broadly comprises:

(a) providing alcoholates of the respective metals employed in the ferroelectric material;

(b) combining the metal alcoholates and subjecting them to an equilibration reaction to form an equilibrated metal alcoholate solution;

(c) hydrolyzing and condensing the equilibrated solution of step (b) by addition of water;

(d) removing the water and alcohol from the pores to leave an aerogel foam;

(e) heat-treating the aerogel foam; and (f) filling the pores with a suitable polymer to form the ferroelectric composite.

In the case of preparing $(Ba,Sr)TiO_3$, an alcoholate solution of the metals in the desired proportions is provided. For titanium, a commercial form of titanium isopropoxide is available, and may be employed in the practice of the invention. For barium and strontium, the alcoholate solution is prepared by dissolving barium and strontium metals in 2-methoxyethanol [step 1]. The titanium alcoholate is added to the barium/strontium alcoholate solution [step 2]. The reactants are subjected to an equilibration, such as refluxing for several hours, e.g., 2 to 8 hours, in a reactor at 135° C. under nitrogen to form an equilibrated solution of the metal alcoholates [step 3]. The equilibrated solution is poured into a mold which has the shape of the desired final composite and a stoichiometric or greater amount of water is added [step 4]. The amount of water is based on the concentration of the metal ions. The water must be diluted by adding one part 2-methoxyethanol to three parts water (by volume) prior to addition to the equilibrated solution to assure uniform gelation. The mold must be sealed with an air-tight lid to prevent evaporation of the solvent during curing. Gels may be cured slowly (1 to 10 days) at room temperature or quickly at elevated temperature (1 to 60 min at 60° C.). Larger additions of water also accelerate gel times.

The gel is then treated, first to remove excess water, and then to remove the solvent. The treatment must be carried out in such a manner that the capillary forces from the solvent and water are not allowed to collapse the porous structure.

The water in the gel is extracted by immersing the mold in a large excess of anhydrous solvent [step 5]. The volume of solvent must be large enough to reduce the residual water content of the gel to less than 0.1% by weight. The solvent may be an alcohol or other organic solvent which is miscible with water and is also readily soluble in liquid carbon dioxide. Examples of such solvents include methanol, ethanol, 2-methoxyethanol, and acetone. Acetone is preferred, since it has a low solubility for partially hydrolyzed alcoholates. Alternately, the mold can be placed in a smaller amount of the solvent to which sufficient desiccant has been added to absorb the water. The time required for water extraction depends on the thickness of the gel. Thin samples on the order of 1 millimeter may be exchanged in a few hours. Thicker samples on the order of a few centimeters may be exchanged in a few days. Faster extraction times may be achieved if the mold can be designed such that vacuum filtration can be used to draw solvent through the gel and flush out residual water.

Figure 3:
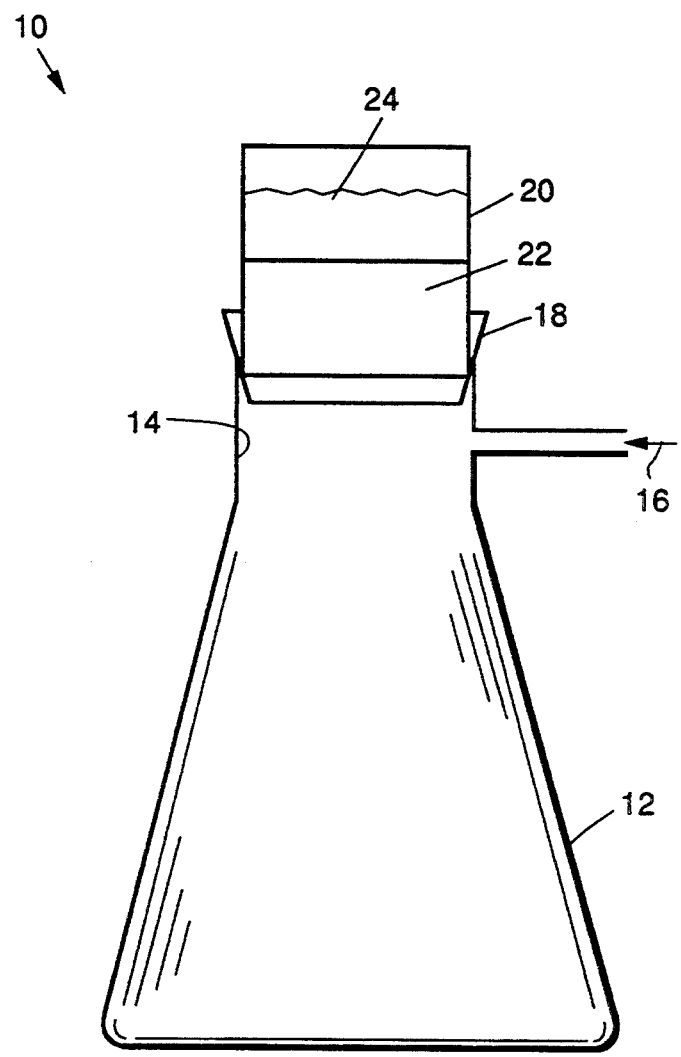
FIG. 3 is a side elevational view of vacuum extraction apparatus useful in the practice of the present invention.

FIG. 3 depicts an example of apparatus 10 suitably employed in the water-extraction step. The apparatus 10 comprises a vacuum filtration flask 12 provided with an opening 14 and an outlet 16. The opening 14 is sealed against the atmosphere with a rubber stopper 18, in which a filter funnel 20 is placed, containing the cured sol-gel 22. Anhydrous solvent 24 is contained in the top of the filter funnel 20. The outlet 16 is connected to a source of vacuum (not shown), such as a vacuum pump. Forming a vacuum in the filtration flask 12 draws the anhydrous solvent 24 through the sol-gel 22, displacing water in its pores. The water, which is removed from the sol-gel 22 until there is less than 0.1% by weight in the sol-gel, is collected in the filtration flask 12.

Next, the solvent in the gel is removed by placing the mold in an autoclave and pressurizing with liquid carbon dioxide at about 15° to 30° C. at pressures of 700 to 1,000 pounds per square inch (psi) (49.2 to 70.3 Kg/cm$^2$) [step 6]. For a liquified compressed gas other than carbon dioxide, the temperature is about 1° to 16° C. below its critical temperature and the pressure is about 70 to 370 psi (4.92 to 26.0 Kg/cm$^2$) below its critical pressure.

The solvent then diffuses out of the gel as liquid carbon dioxide diffuses in. A slow flow of fresh carbon dioxide into the autoclave is maintained in order to flush out the extracted solvent. The total volume of carbon dioxide must be sufficient to reduce the residual solvent content to less than 0.1%. As with the water extraction process, the immersion and flow time depend on the thickness of the sample. Thin samples may be extracted in a few hours; thicker samples may take a few days.

The gel is then dried by heating the autoclave above the critical point of carbon dioxide, 31° C. at 1,070 psi (75.2 Kg/cm$^2$), to a temperature of 40° to 60° C. for about 1 hour [step 7]. As a result of heating, the pressure rises to a range of about 1,400 to 2,000 psi (98.4 to 140.6 Kg/cm$^2$). For a liquified compressed gas other than carbon dioxide, the temperature is about 9° to 29° C. above its critical temperature and the pressure generated is about 330 to 930 psi (23.2 to 65.4 Kg/cm$^2$) above its critical pressure.

During the transformation of liquid to supercritical fluid, the surface tension of the fluid in the pores of the gel is reduced to zero, thus removing stresses induced by capillary forces. After the supercritical state is reached, the pressure may be slowly released at constant temperature over a period of about 1 hour, converting the supercritical fluid into gas, thus yielding a solvent-free aerogel.

Carbon dioxide is preferred, since it exhibits a critical temperature much lower than alcohols (31° C. vs. 255° C.) and is non-flammable and non-toxic. Other liquified compressed gases with convenient critical points may be used, provided that the temperatures and pressures are adjusted accordingly. Examples of such fluids include nitrous oxide, sulfur hexafluoride, and trifluoromethane. The dried gel at this stage is exceedingly fragile and must be handled with care.

Figure 4:
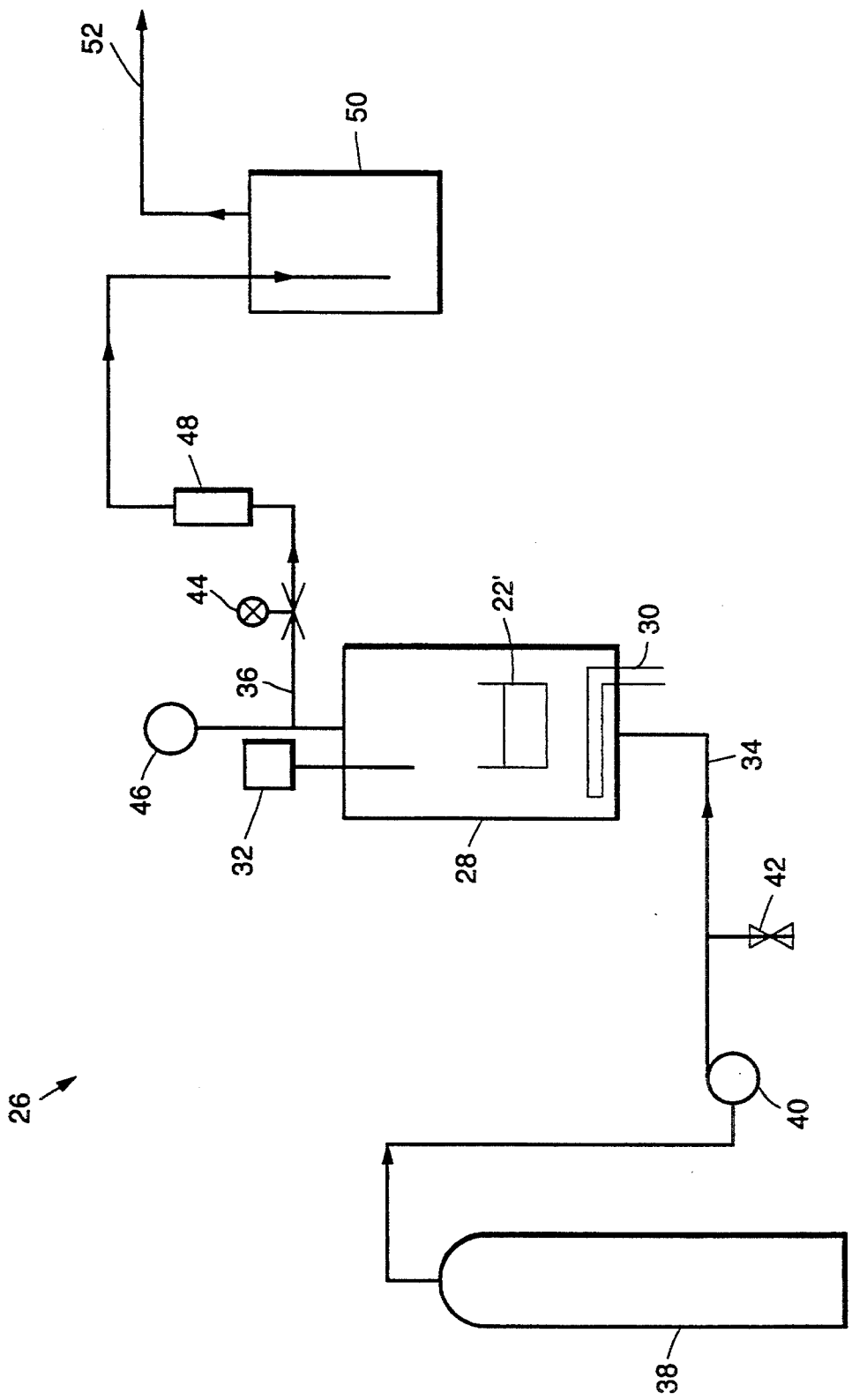
FIG. 4 is a schematic diagram of carbon dioxide extraction apparatus useful in the practice of the present invention.

FIG. 4 depicts an example of apparatus 26 suitable for extracting the solvent from the water-depleted sol-gel 22', using carbon dioxide. The sol-gel 22' is placed in a pressure vessel, or autoclave, 28, which is provided with a heater 30, a thermocouple 32 for measuring temperature, inlet means 34 for introducing a liquefiable gas, here, carbon dioxide, and outlet means 36 for removal of the gas.

The gas is introduced to the autoclave 28 from a storage reservoir 38 and is compressed by a high pressure pump 40. A pressure relief valve 42 is provided in the inlet line 34.

Exiting of spent carbon dioxide from the autoclave 28 is controlled by a flow control valve 44 in the outlet line 36. A pressure gauge 46 before the flow control valve 44 and flow meter 48 after the flow control valve are provided for monitoring the pressure. A solvent trap 50 collects the solvent removed from the pores of the sol-gel 22', and the spent carbon dioxide is vented via vent 52.

The dried gel is heat-treated next in a conventional or a microwave furnace [step 8]. A temperature range of 500° to 900° C. for a period of 1 to 120 minutes is utilized to convert the ferroelectric aerogel from an amorphous to a crystalline microstructure. The sintering process is carefully controlled so the gel shrinkage is minimized and densification is not allowed to proceed to full density. Microwave sintering can be employed with potentially more accurate control of the sintering process. Conventional ovens and furnaces may also be utilized for sintering ferroelectric aerogels.

The effect of heat treatment temperature on the crystallinity of the aerogel can be determined through the use of x-ray diffraction. The degree of crystallinity depends upon the composition, time, and temperature as the principal variables. For example, heat treatments of 105° through 500° C. yield amorphous BST; however, as the temperature approaches 600° C., a very pure single-phase BST is obtained. The results of x-ray diffraction studies are shown for the heat-treated BST samples in Table II. Lower heat treatment temperatures (near 600° C.) yield higher porosity and lower dielectric constant values.

TABLE II

| X-Ray Diffraction Results for BST Samples Heated in Air. | |
|---|---|
| Temperature (°C.) | Crystallinity |
| 105 | Amorphous |
| 300 | Amorphous |
| 500 | Amorphous |
| 600 | Fully crystalline[1] |
| 700 | Fully Crystalline[1] |

Note:[1](Cubic BST) Lattice Parameter, a = 3.957 Å

The last step in the process is to infiltrate the aerogel pores with a low dielectric loss polymer [step 9]. As used herein, the term "low dielectric loss" means a dielectric loss of less than 3. Polystyrene is a low-loss polymer which may be employed for this purpose. Examples of other low-loss polymers include polyethylene, polypropylene, fluorinated poly(ethylene-co-propylene), polycarbonate, and polyphenylene oxide.

The infiltration process may be accomplished by first removing any surface moisture from the aerogel by evacuating with a mechanical vacuum pump, since the presence of any moisture will result in a greatly increased value of dielectric loss, which is detrimental for antenna applications. Gentle heating while evacuating the aerogel will speed up the process of moisture removal. Normally, a time period of 2 to 4 hours at 25° C. can be reduced to one of 30 minutes to 1 hour by heating at 105° C.

Next, the aerogel is allowed to cool to 25° to 30° C. and the impregnating monomer or mixture of monomers with suitable initiator is introduced while still maintaining vacuum. The vacuum is maintained for 30 to 120 minutes to ensure that all the pores are filled with the polymer. The pressure is then increased to 100 to 2,500 psi (7.03 to 175.8 Kg/cm$^2$) by introducing nitrogen, argon, or other inert gas to pressurize the vessel. The inert gas provides a means for forcing the polymer into any pores not filled by the vacuum infiltration step alone. The impregnating mixture is polymerized and cross-linked (in the case of difunctional monomer) by increasing the temperature to 40° to 80° C. for a period of 1 to 10 days. Generally, the use of lower temperatures and longer curing times reduces the stresses imposed upon the aerogel structure.

The objective is to achieve a cross-linked, hardened polymer without destroying the connectivity of the aerogel skeleton structure. It has been found that a temperature of 40° C. and a curing time of 4 days yields a connected aerogel microstructure with no visible cracks using benzoyl peroxide as initiator. The curing time and temperature can be shortened from 4 to 2 days by using a different initiator such as t-butyl peroxodecanoate under atmospheric or elevated pressures at 50° to 80° C.

The above-described process can be varied to tailor the pore size, distribution, and pore volume. In this way, together with the infinite flexibility of the aerogel process with regard to ferroelectric compositions, the dielectric properties can be engineered to meet a wide range of phase array radar applications.

Thus, there has been disclosed ferroelectric aerogel composites for voltage-variable dielectric tuning and a method for making the same. It will be readily apparent to those skilled in this art that various changes and modifications of an obvious nature may be made, and all such changes and modifications are considered to fall within the scope of the invention, as defined by the appended claims.

What is claimed is:

1. A process for preparing a ferroelectric composite comprising a sol-gel of a ferroelectric material comprising an oxide of at least two metals, said ferroelectric composite impregnated with a polymer, comprising:
   (a) providing alcoholates of said at least two metals to form metal alcoholates;
   (b) combining said metal alcoholates and subjecting them to an equilibration reaction to form an equilibrated metal alcoholate solution;
   (c) hydrolyzing and condensing said equilibrated metal alcoholate solution by addition of water to form a gel having pores permeated with water and alcohol;
   (d) removing said water and alcohol from said pores of said gel to leave an aerogel foam;
   (e) heat-treating said aerogel foam; and
   (f) filling said pores with said polymer to form said ferroelectric composite, said polymer having a dielectric constant of less than 3.

2. The process of claim 1 wherein said ferroelectric material comprises a crystalline oxide having a perovskite structure.

3. The process of claim 2 wherein said ferroelectric material comprises a perovskite selected from the group consisting of BaTiO$_3$, SrTiO$_3$, and (Ba,Sr)TiO$_3$.

4. The process of claim 3 wherein said metal alcoholates comprise titanium iso-propoxide and the reaction products of barium and 2-methoxyethanol and of strontium and 2-methoxyethanol.

5. The process of claim 3 wherein said metal alcoholates are equilibrated by refluxing for a period of time ranging from about 2 to 8 hours.

6. The process of claim 3 wherein said metal alcoholates are hydrolyzed and condensed to form said gel by adding thereto at least a stoichiometric quantity of water, based on the concentration of said metals.

7. The process of claim 3 wherein said water and alcohol are removed from said pores by a process comprising:
   (a) extracting said water by immersing said gel in a volume of solvent sufficient to reduce the residual water content to less than 0.1% by weight, in which said solvent is miscible with water and soluble in liquified compressed gas;
   (b) extracting said solvent by autoclaving in a volume of liquified compressed gas sufficient to reduce the residual content of said solvent to less than 0.1% by weight with said liquified compressed gas at a temperature of 1° to 16° C. below its critical temperature and at a pressure of 70 to 370 pounds per square inch (5 to 26 Kg/cm$^2$) below its critical pressure;
   (c) heating said liquified compressed gas to a temperature 9° to 29° C. above its critical point, thus generating supercritical fluid at a pressure of about 330 to 930 pounds per square inch (23.2 to 65.4 Kg/cm$^2$) above its critical pressure for about 1 hour; and
   (d) depressurizing said supercritical fluid at constant temperature to atmospheric pressure over a period of at least 1 hour, thus converting said supercritical fluid into gas, and thereby providing said aerogel foam.

8. The process of claim 7 wherein said solvent is selected from the group consisting of acetone, methanol, ethanol, and 2-methoxyethanol.

9. The process of claim 7 wherein said liquefied compressed gas is selected from the group consisting of carbon dioxide, nitrous oxide, sulfur hexafluoride, and trifluoromethane.

10. The process of claim 3 wherein said crystallinity is induced in said aerogel foam by sintering at a temperature ranging from about 500° to 900° C. for a period of time ranging from 1 to 120 minutes.

11. The process of claim 1 wherein said pores are filled with said polymer by vacuum impregnation.

12. The process of claim 11 wherein following said vacuum impregnation, said aerogel is subjected to an inert gas under a pressure ranging from about 100 to 2,500 pounds per square inch (7.03 to 175.8 Kg/cm$^2$).

13. The process of claim 11 wherein said polymer is selected from the group consisting of polystyrene, polyethylene, polypropylene, fluorinated poly(ethylene-co-propylene), polycarbonate, and polyphenylene oxide.

14. A process for preparing a ferroelectric composite comprising a sol-gel of a ferroelectric material consisting essentially of (Ba,Sr)TiO$_3$ impregnated with a polymer, comprising:
   (a) forming a mixture of titanium iso-propoxide and the reaction products of barium and 2-methoxyethanol and of strontium and 2-methoxyethanol;
   (b) subjecting said mixture to an equilibration reaction by refluxing said mixture to form an equilibrated metal alcoholate solution;

(c) hydrolyzing and condensing said equilibrated metal alcoholate solution with at least a stoichiometric amount of water to form a gel having pores permeated with water and alcohol;

(d) removing said water and alcohol from said pores of said gel to leave an aerogel foam;

(e) inducing full crystallinity in said aerogel foam by sintering; and (f) vacuum impregnating said pores with said polymer to form said ferroelectric composite.

15. The process of claim 14 wherein said refluxing is done for a period of time ranging from about 2 to 8 hours.

16. The process of claim 14 wherein said water and alcohol are removed from said pores by a process comprising:

(a) extracting said water and alcohol by immersion in a volume of acetone sufficient to reduce the residual water content to less than 0.1% by weight;

(b) extracting said acetone by autoclaving in a volume of liquid carbon dioxide sufficient to reduce the residual acetone content to less than 0.1% by weight with said liquid carbon dioxide at a temperature of 15° to 30° C. and at a pressure of 700 to 1,000 pounds per square inch (49.2 to 70.3 $Kg/cm^2$);

(c) heating said liquid carbon dioxide to a temperature of about 40° to 60° C. for about 1 hour, thus generating supercritical carbon dioxide at a pressure of about 1,400 to 2,000 pounds per square inch (98.5 to 147 $Kg/cm^2$); and (d) depressurizing said supercritical carbon dioxide at constant temperature to atmospheric pressure over a period of at least a 1-hour, thus converting said supercritical carbon dioxide into gas, and thereby provide said aerogel foam.

17. The process of claim 14 wherein said sintering is done at a temperature ranging from about 500° to 900° C. for a period of time ranging from 1 to 120 minutes.

18. The process of claim 14 wherein following said vacuum impregnation, said aerogel is subjected to an inert gas under a pressure ranging from about 100 to 2,500 pounds per square inch (7.03 to 175.8 $Kg/cm^2$).

19. The process of claim 14 wherein said polymer is selected from the group consisting of polystyrene, polyethylene, polypropylene, fluorinated poly(ethylene-co-propylene), polycarbonate, and polyphenylene oxide.

* * * * *